INVENTOR
Clyde E. Smith.

Patented Mar. 20, 1945

2,372,128

UNITED STATES PATENT OFFICE 2,372,128

ELECTRONIC TIMING CONTROL

Clyde E. Smith, Warren, Ohio, assignor to Westinghouse Electric & Manufacturing Company, East Pittsburgh, Pa., a corporation of Pennsylvania Application February 12, 1943, Serial No. 475,661

12 Claims. (Cl. 250—27)

This invention relates to an electronic timing control and has particular relation to a system in which current is supplied from a source of power to a load under the control of electric discharge valves.

In resistance welding apparatus constructed in accordance with the teachings of the prior art, a pair of inversely connected ignitrons is interposed between an alternating current source and the welding transformer to control the flow of current to the transformer. For each weld the ignitrons are rendered conductive alternately in successive half periods of the source during a predetermined welding time interval.

The ignitrons are rendered conductive under the control of an electric discharge valve of the arc-like type, preferably a thyraton, which is hereinafter referred to as the control valve. When the control valve becomes conductive, the ignitron having a positive potential on its anode becomes conductive. The control valve is normally maintained non-conductive by a biasing potential impressed in its control circuit, although a potential impulse tending to render the control valve conductive is also impressed in the control circuit at a preselected instant in each half period of the alternating current source. A timing system such as is shown in the patent to John W. Dawson, No. 2,189,601 dated February 6, 1940, and assigned to Westinghouse Electric & Manufacturing Company, is employed to change the biasing potential during the welding time interval so that the potential impulses are effective to render the control valve conductive at the selected instant in each half period of a source. The instant at which the control valve and therefore the ignitrons become conductive in each half period is preselected so that the welding current-time product is that necessary to produce a satisfactory weld. The feature of supplying current for welding during a preselected portion of each half period is commonly known as heat control.

The timing system includes an electric discharge device known as the start valve and another electric discharge device known as the stop valve. Both of these discharge devices are of the arc-like type, preferably thyratrons. After the closing of a switch by the operator, the start valve becomes conductive to initiate the welding interval. Thereafter, the control valve becomes conductive at the selected instant in each half period of the source until the stop valve becomes conductive. The control circuit of the stop valve includes a biasing potential tending to maintain it non-conductive. However, a capacitor in the control circuit of the stop valve is also in circuit with the start valve in such manner as to be charged at a preselected rate from the instant the start valve becomes conductive. After a predetermined interval of time, the capacitor attains a potential sufficient to counteract the biasing potential and render the stop valve conductive which, in turn, renders the ignitrons non-conductive.

On the whole, the prior art system as described operates quite satisfactorily. However, it has has been found that upon occasions current is supplied to the welding transformer for a welding interval less by one-half period of the alternating source than was intended. This situation arises particularly when the control valve is rendered conductive late in each half cycle for heat control. For example, if the apparatus has been set to supply current during the last 25% of each of ten half periods of the source, the apparatus sometimes supplies the current during only nine half periods of the source. Such variations are obviously undesirable, particularly when high quality welds are to be made or when thin sheets of material are to be welded. In both cases, the current-time product must be very accurately controlled for satisfactory welding.

It is accordingly an object of my invention to provide novel apparatus for accurately timing the duration of current flow from a source of periodically pulsating potential to a load.

A further object of my invention is to provide new and improved apparatus for precisely limiting the duration of current flow from a source of periodically pulsating potential to a load, to a preselected number of periods of said source.

Another object of my invention is to provide improved apparatus for supplying current from a source of periodically pulsating potential to a load during a preselected portion of each period of the source in which the number of periods in which current flows may be accurately predetermined.

More specifically it is an object of my invention to provide new and improved welding apparatus for use with an alternating current source and having heat control and means for precisely controlling the length of the welding interval in terms of half periods of the source.

My invention arises from the realization that the supply of current from the alternating potential source to the transformer is sometimes omitted in the last half period of the intended interval because the stop valve becomes conductive before the occurrence of the potential impulse for rendering the control valve conductive. The instant at which the stop valve is rendered conductive is determined by the rate of charge of the capacitor in its control circuit. The rate of charge of the capacitor in turn is determined by the manual setting of a potentiometer. It is apparent that if the potentiometer were calibrated so that the sop valve is rendered conductive at the exact end of the last half period of the welding interval, the potentiometer would often be set inadvertently so that the stop valve would not become conductive until the next half period had already begun.

Because of the possible human error in setting the potentiometer, the latter is calibrated so that a setting for a predetermined number of half periods of welding current causes the stop valve to be rendered conductive slightly before the expiration of the last half period. Since an ignitron continues to conduct current until the end of any half period in which it is rendered conductive, the fact that the stop valve becomes conductive shortly before the expiration of the half period usually has no effect upon the supply of welding current.

However, if the impulse for rendering the control valve conductive is arranged to occur at a selected instant late in the last half period, the combination of the human error in setting the potentiometer, a possible slight error in calibration, and a changing with time and use of the constants of the charging circuit and the characteristics of the valve occasionally causes the stop valve to be rendered conductive prior to the occurrence of the impulse for rendering the control valve conductive.

The undesirable situation just described is avoided in accordance with my invention by providing means for preventing operation of the stop valve except at substantially the end of a half period of the alternating current source. Another potential is impressed in the control circuit of the stop valve which has a sharp magnitude peak at the end of each half period of the source. Then as the capacitor potential gradually increases, the resultant potential in the control circuit of the stop valve gradually increases but has magnitude peaks at the end of each half period of the source. The wave form of the resultant potential is such that regardless of the rate of increase of the capacitor potential, the resultant potential first becomes more positive than the critical potential of the stop valve at substantially the end of a half period. Since the stop valve can only be rendered conductive at substantially the end of a half period of the source, any slight error in the rate of charging of the capacitor does not cause a change in the number of half periods of welding current supplied even if the impulse for rendering the control valve conductive occurs late in the last half period.

In some cases it may be desirable to limit the welding interval to either an even or an odd number of half periods. This may be accomplished in accordance with my invention by impressing still another potential in the control circuit of the stop valve. The additional potential is an alternating one of the same frequency but displaced in phase relative to the source. In this manner the magnitude of every other one of the resultant potential peaks is increased and the magnitude of the intervening peaks is decreased. The resultant potential then has a high magnitude peak only at the end of alternate half periods of the source. Means are provided to initiate the welding interval in a half period of a predetermined polarity. Then if the high magnitude peaks in the control circuit of the stop valve occur at the end of every even numbered half period thereafter, welding current is supplied for an even number of half periods. By shifting the phase of the alternating potential in the control circuit of the stop valve from leading to lagging relative to the source, the location of the high magnitude peaks is changed from the end of every even numbered half period to the end of every odd numbered half period.

The novel features that I consider characteristic of my invention are set forth with particularity in the claims. The invention itself, however, both as to its organization and its method of operation, together with additional objects and advantages thereof will best be understood from the following description of a specific embodiment when read in connection with the accompanying drawings, in which:

Figure 1:
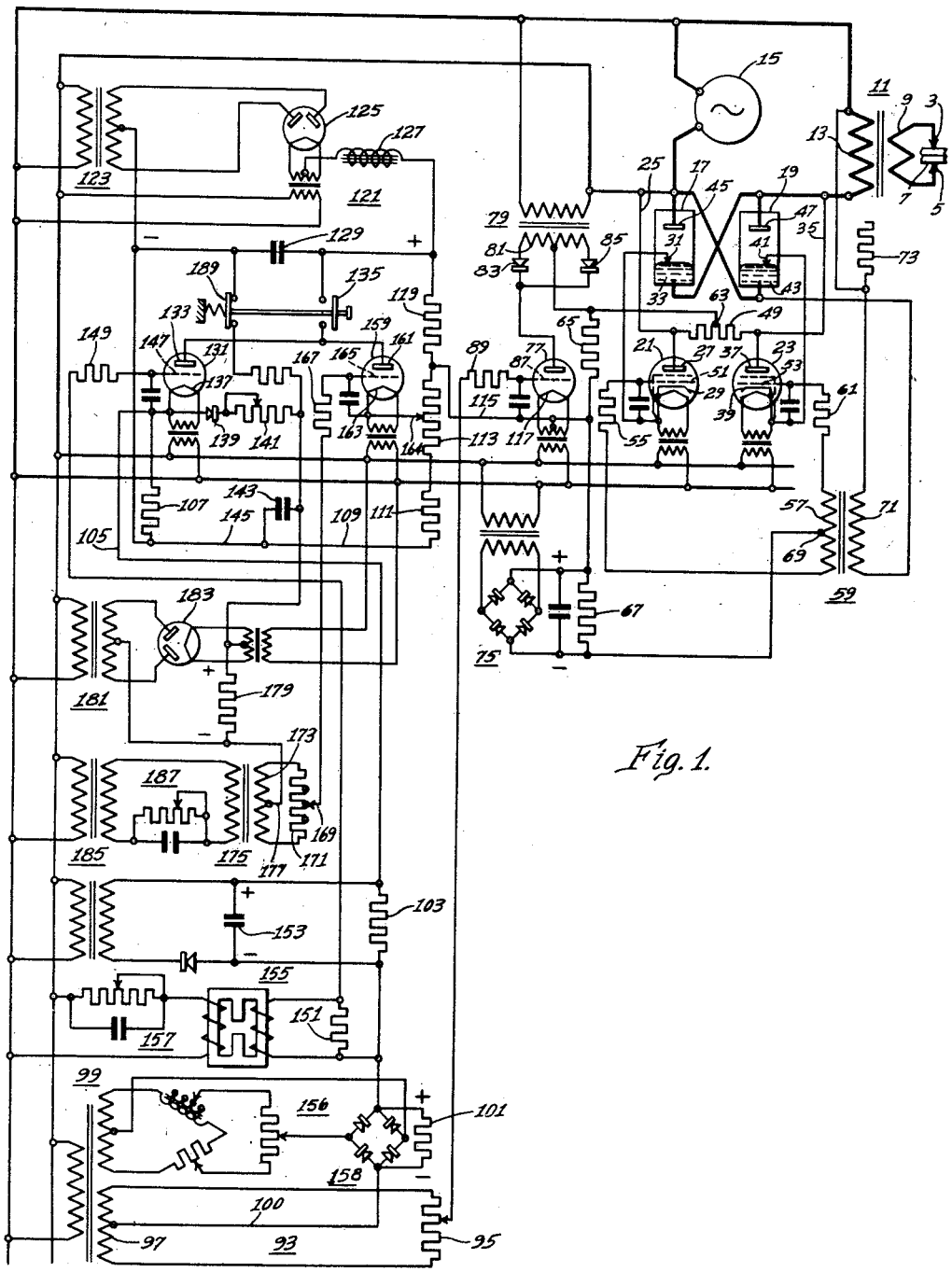
Figure 1 illustrates my invention as applied to a resistance welding apparatus.

In the apparatus as shown in the drawings, a pair of welding electrodes 3 and 5 engage the material 7 to be welded and are connected across the secondary 9 of a welding transformer 11. The primary 13 of the welding transformer is supplied with power from a source of alternating-current potential 15 through a pair of inversely-connected ignitrons 17 and 19. A pair of electric discharge devices 21 and 23, preferably thyratrons, which are hereinafter designated as firing valves, are arranged to control the ignition of the ignitrons 17 and 19. The ignition circuit for one of the ignitrons 17 extends from one side of the source 15 through a conductor 25, the anode 27 and cathode 29 of the firing valve 21, the igniter 31 and cathode 33 of the ignitron 17 and the primary 13 of the welding transformer to the other side of the source. The ignition circuit of the other ignitron 19 may be traced from the other side of the source 15 through the primary 13 of the welding transformer, a conductor 35, the anode 37 and cathode 39 of the firing valve 23, the igniter 41 and cathode 43 of the ignitron 19 to the other side of the source. It is to be noted that the anode 27 of firing valve 21 is always of the same polarity as the anode 45 of the corresponding ignitron 17, and the anode 37 of firing valve 23 is of the same polarity as the anode 47 of ignitron 19. Thus, when a firing valve becomes conductive, ignition of the corresponding ignitron is effected. When an ignitron becomes conductice, the ignition circuit through the corresponding firing valve is short-circuited by the discharge path through the ignitron, and the firing valve is rendered non-conductive. The ignitron then becomes non-conductive at the end of the half-period of the source potential in which it is ignited.

The anodes 27 and 37 of the firing valves 21 and 23 are interconnected by a resistor 49. The grid 51 of the firing valve 21 is connected to the grid 53 of the other firing valve 23 in a circuit extending through a grid resistor 55, a secondary 57 of an auxiliary transformer 59, and another grid resistor 61. The center tap 63 of the resistor 49 interconnecting the anodes of the firing valves is connected through a pair of resistors 65 and 67 to the center tap 69 of the secondary 57 of the auxiliary transformer 59. The control circuit of the firing valve 21 may then be traced from its grid 51 through the grid resistor 55 and a portion of the secondary 57 to the center tap 69 and thence through the resistors 67 and 65 to the center tap 63 of the resistor 49. The control circuit then continues from one end of the resistor 49 through the conductor 35, the cathode 33 and igniter 31 of the ignitron 17 to the cathode 29 of the firing valve 21. The control circuit of the other firing valve 23 may be traced from grid 53 through resistor 61, a portion of secondary 57, resistors 67 and 65, a portion of resistor 49, conductor 25, cathode 43 and igniter 41 of ignitron 19 to the cathode 39 of the valve.

An alternating potential derived from the source 15 appears across the resistor 49 interconnecting the anodes of the firing valves. To eliminate the influence of this alternating potential from the control circuits of the valves 21 and 23, the primary 71 of the auxiliary transformer 59 is connected oppositely across the source 15. Thus the potential appearing across the secondary 57 of the auxiliary transformer 59 balances out the potential appearing across the resistor 49 interconnecting the anodes of the firing valves. A resistor 73 is connected across the primary of the welding transformer to absorb current surges and prevent backfire of the ignitrons.

It is apparent that the two resistors 65 and 67 are common to the control circuits of both firing valves 21 and 23. A direct-current biasing potential is impressed across the resistor 67 from an auxiliary source 75. This biasing potential is of such polarity and magnitude as to normally maintain the firing valves non-conductive. The other resistor 65 is connected in series with another electric discharge device 77 in an auxiliary circuit. The device 77 is preferably a thyratron and is designated hereinafter as the control valve. Another auxiliary transformer 79 is energized from the alternating-current source, and its secondary 81 is connected in circuit with control valve 77 and resistor 65 through a pair of rectifiers 83 and 85. The arrangement is such that a rectified alternating-current potential is thereby impressed on the auxiliary circuit. When the control valve 77 becomes conductive, current flows through the resistor 65 in series therewith until the end of the half-period of the alternating-current potential, at which time the anode-cathode potential of the control valve reaches zero and the valve ceases to conduct. The current flowing through the resistor 65 develops a potential thereacross of such polarity and magnitude as to counteract the biasing potential across the resistor 67 in the control circuits of the firing values. The particular firing valve whose anode is positive at the instant the control valve becomes conductive, is then rendered conductive to effect ignition of the corresponding ignitron.

The control circuit for the control valve 77 may be traced from the grid 87 thereof through a grid resistor 89, a balancing bridge 93 including a resistor 95 and secondary 97 of an auxiliary transformer 99, conductor 100, resistors 101 and 103, conductor 105, another resistor 107, a conductor 109, a pair of resistors 111 and 113 and conductor 115 to the cathode 117 of the valve. The pair of resistors 111 and 113 are connected in series with a third resistor 119. A direct current potential is impressed across the series connected resistors 111, 113 and 119 from an auxiliary source 121 comprising a transformer 123, a rectifier 125 and filtering elements 127 and 129. The potential thus developed across the resistors 111 and 113 in the control circuit of the control valve 77 is of such polarity and magnitude as to render the grid 87 highly negative with respect to the cathode 117.

An electric discharge valve 131, preferably a thyratron, has its anode 133 connected through a push-button switch 135 to the positive terminal of the direct-current source 121. The valve 131 is designated as a "start" valve and its cathode 137 is connected through a rectifier 139, a potentiometer 141, a capacitor 143 and a conductor 145 to the negative terminal of the source. The resistor 107 is connected in parallel with the rectifier 139, potentiometer 141, and capacitor 143. Thus, when the start valve 131 is conductive, the terminal of the resistor 107 which is connected to the cathode 137 of the start valve becomes positive with respect to the cathode 117 of the control valve 77. As a result, the grid 87 of the control valve becomes less negative with respect to the cathode 117.

The control circuit of the start valve 131 may be traced from its grid 147 through a grid resistor 149 and resistors 151 and 103 to the cathode 137. A direct-current biasing potential is impressed across the resistor 103 from an auxiliary source 153 and is of such polarity as to tend to maintain the start valve 131 non-conductive. A potential impulse is periodically impressed across the resistor 151 through an impulse transformer 155 energized from the alternating-current source 15 through a phase-shafting circuit 157. The phase-shifting circuit 157 is adjusted so that the potential impulse is impressed across the resistor 151 at an instant in the period of the alternating-current source corresponding to the power factor of the load. The potential impulse across the resistor 151 is sufficient to counteract the biasing potential across the resistor 103. Thus, when the push-button switch 135 is closed, the start valve 131 is rendered conductive by the next succeeding potential impulse across the resistor 151.

While the start valve 131 is conductive, the biasing potential in the control circuit of the control valve is such that the grid 87 is less negative with respect to the cathode 117 than before. A second phase-shifting circuit 156 is energized from the alternating-current source 15 through transformer 99. The potential derived therefrom is rectified by the rectifier system 158 and impressed across the resistor 101 in the control circuit of the control valve 77. The direction of rectification is such that the potential appearing across the resistor has the wave form of an inverted rectified alternating potential with respect to the grid. The magnitude of the biasing potential in the control circuit is now such that the peaks of the inverted rectified alternating potential appearing across the resistor 101 are more positive than the critical potential of the control valve. The phase position of the potential across the resistor 101 is adjusted to determine the instant in a half-period of the alternating source at which the control valve 77 is rendered conductive. In other words, heat control adjustment is effected by shifting the phase of the potential across resistor 101.

Current flowing through the start valve 131 charges the capacitor 143 at a rate determined by the setting of the potentiometer 141 in series therewith. The capacitor 143 is also connected in the control circuit of another electric discharge device 159, preferably a thyratron, which is designated a "stop" valve. The anode 161 of the stop valve 159 is also connected to the positive terminal of the direct-current source 121 through the push button switch 135. The cathode 163 of the stop valve is connected to an intermediate tap 164 on the resistor 113.

The control circuit of the stop valve may then be traced from the grid 165 through the grid resistor 167 to the adjustable contactor 169 in contact with a tap on a resistor 171 connected across the secondary 173 of an auxiliary transformer 175. The control circuit then continues from a center tap 177 on the secondary 173 through a resistor 179, the capacitor 143, conductor 109, resistor 111 and the intermediate tap 164 of the resistor 113 to the cathode 163 of the valve 159. A potential is impressed across the resistor 179 which is derived from the source 15 through another auxiliary transformer 181 and a full-wave rectifier 183. The rectifier 183 is so connected that the potential appearing across the resistor 179 has the wave form with respect to the grid 165 of an inverted, rectified alternating potential of the same frequency and phase as the source.

The auxiliary transformer 175 supplying energy to the balancing circuit is energized from the source 15 through another auxiliary transformer 185, and a phase shifting circuit 187. Then when the adjustable contactor 169 is in contact with the center tap of the resistor 171 in the balancing circuit, the potential impressed in the control circuit of the stop valve 159 between contactor 169 and tap 177 on secondary 173 has a zero magnitude. When the adjustable contactor 169 is in contact with the upper tap of the resistor 171 an alternating potential leading in phase relative to the source potential is impressed in the control circuit. On the other hand, when the adjustable contactor 169 is in contact with the lower tap, an alternating potential lagging in phase is impressed in the control circuit. The change in phase of the potential $E_{169-177}$ is caused by the change in instantaneous polarity of the contactor 169 and tap 177 when the contactor position is changed.

Figure 2:
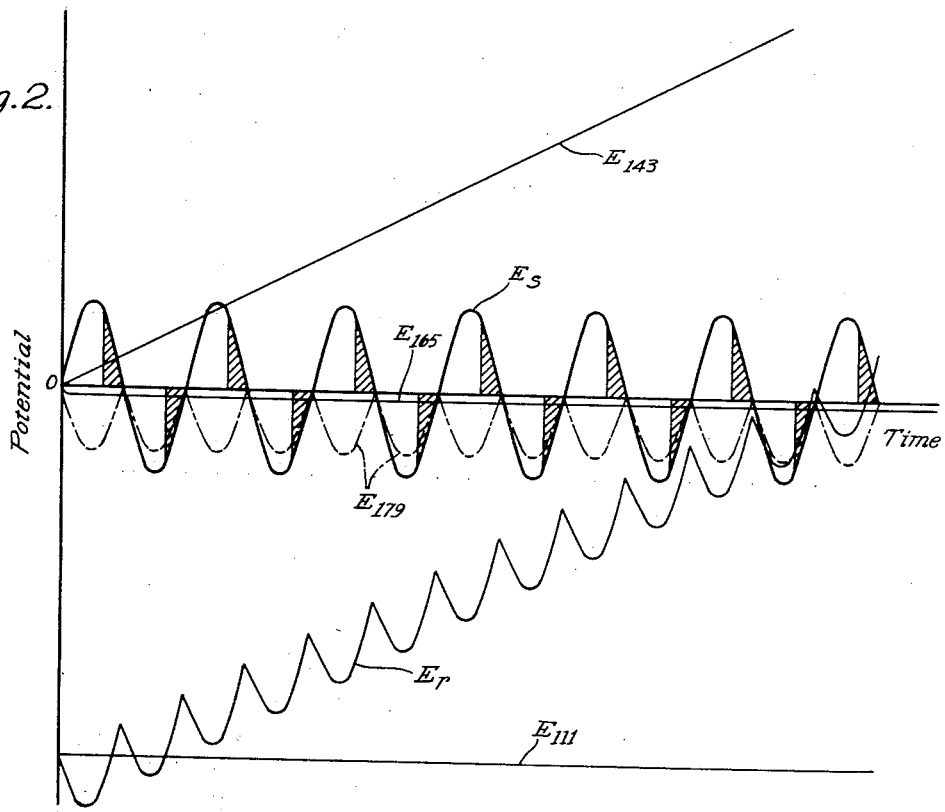
Figs. 2 and 3 are graphs illustrating the operation of the apparatus shown in Fig. 1.
Figure 3:
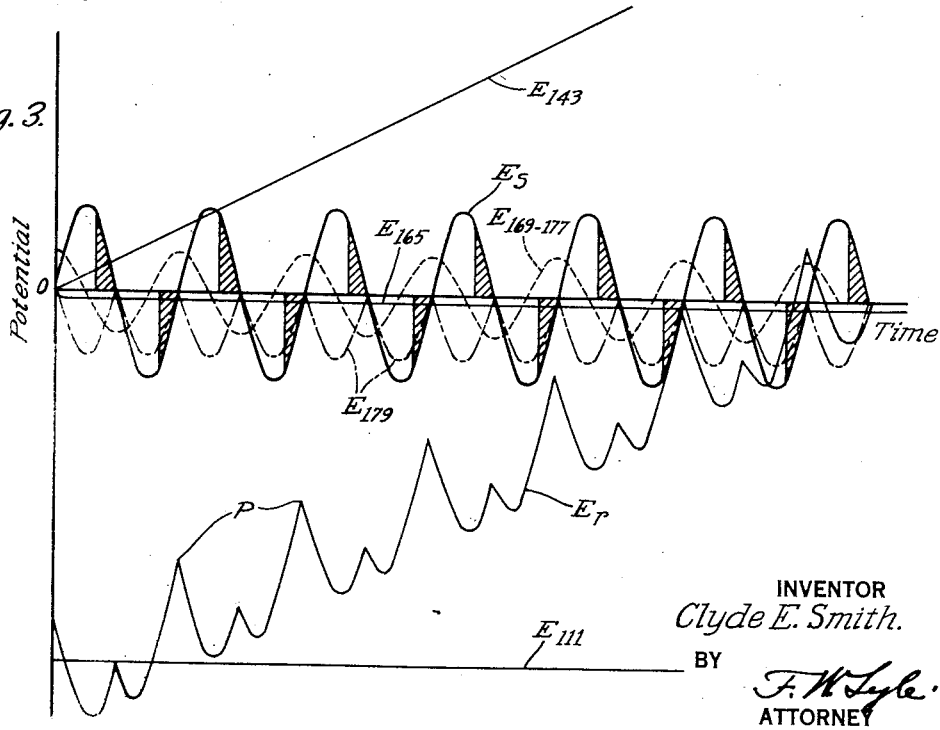

The operation of the stop valve may best be understood by reference to the curves of Figs. 2 and 3. Fig. 2 represents the operation of the stop valve when the adjustable contactor 169 is in contact with the center tap of the resistor 171 in the balancing circuit the start valve having become conductive at the zero time point on the graph. The curve $E_s$ represents the source potential and a portion of each half period thereof is shaded to indicate a flow of current to the welding transformer. As illustrated, welding current is supplied during approximately the last 30% of the half period. The critical grid potential of the stop valve then shown at $E_{165}$ and the resultant potential in the control circuit of the stop valve must become more positive than the critical potential to render the valve conductive. The line $E_{111}$ illustrates the constant bias potential impressed in the control circuit by resistor 111 and the portion of resistor 113 in the control circuit. $E_{143}$ represents the gradually increasing potential across the capacitor 143. The inverted rectified alternating potential appearing across the resistor 179 is then shown at $E_{179}$. The resultant potential $E_r$ is then obtained by adding the potentials $E_{179}$, $E_{143}$ and $E_{111}$ impressed in the control circuit of the stop valve. It is apparent from the curve of the resultant potential $E_r$ that it will become more positive than the critical potential $E_{165}$ at or substantially at the end of a half period of the source $E_s$ regardless of the rate of increase of the capacitor potential $E_{143}$. Thus it is impossible for the stop valve to be rendered conductive at an instant in a half period prior to the instant at which current flow to the welding transformer is initiated.

Fig. 3 illustrates the operation of the welding apparatus when the adjustable contactor 169 is in contact with the upper tap of the resistor 171 in the balancing circuit. The same potentials which were illustrated in Fig. 2 are also shown in Fig. 3. However, in addition, there is an alternating potential $E_{169-177}$ supplied from the balancing circuit which is leading in phase relative to the source $E_s$. The resultant potential $E_r$ then assumes a form such that high magnitude peaks P occur at the end or substantially the end of each even numbered half period of the source. As a result, the stop valve is rendered conductive at the end of a period of the source $E_s$ regardless of the rate of increase of the capacitor potential $E_{143}$.

By changing the adjustable tap 169 from contact with the upper tap on the resistor 171 to the lower tap, the polarity of the alternating potential impressed in the control circuit by the balancing circuit is reversed. It is then apparent that the higher peaks of the resultant potential would occur at the end of each odd numbered half period of the source.

To initiate a welding operation, the push-button switch 135 is closed. The start valve 131 then becomes conductive when the next potential impulse is impressed across the resistor 151 in its control circuit. When the start valve 131 becomes conductive, the peaks of the inverted rectified alternating potential supplied across the resistor 101 rise above the critical potential value of the control valve 77 at a preselected instant in each half-period of the source. As the control valve 77 becomes conductive in each half-period, the firing tubes 21 and 23 and their associated ignitrons 17 and 19 are rendered conductive alternately. The balancing bridge 93 in the control circuit of the control valve 77 ordinarily does not affect the control potential. However, if the firing characteristics of the ignitrons 17 and 19 should differ, the bridge 93 may be set so that it is slightly unbalanced. As a result, the potential in the control circuit of valve 77 becomes slightly higher in the half-periods of the alternating potential in which one ignitron is rendered conductive than in the other half-periods and so compensates for the difference in the ignitron characteristics.

When the start valve 131 becomes conductive, charging of the capacitor 143 in the control circuit of the stop valve 159 at a preselected rate is also initiated. After a time interval which is dependent upon the rate of charging of the capacitor, the potential across the capacitor 143 rises to such magnitude that the resultant potential in the control circuit of the stop valve 159 renders it conductive at the end or substantially at the end of a half-period of the source. Upon the stop valve 159 becoming conductive, the biasing potential in the control circuit of the control valve 77 is changed so that the grid 87 is highly negative relative to the cathode 117 to prevent further conduction by the control valve 77 and, therefore, render the ignitrons 17 and 19 non-conductive. Another welding operation may be initiated by releasing the push-button switch and then reclosing it. A second contactor 189 on the push-button switch is closed when the switch is released to complete a discharging circuit for the capacitor 143 and condition the capacitor for a succeeding operation.

Although I have shown and described a specific embodiment of my invention, I am fully aware that many modifications thereof are possible. My invention, therefore, is not to be restricted except insofar as is necessitated by the prior art and the spirit of the appended claims.

I claim as my invention:

1. For use in supplying power to a load from a source of periodically pulsating potential, the combination comprising electric discharge valve means of the arc-like type interposed between said source and load, control means for rendering said valve means conductive at a preselected instant in each period of said source potential, stopping means operable to render said control means ineffective whereby said valve means is rendered non-conductive, and means for preventing operation of said stopping means except at substantially the end of a period of said source potential.

2. For use in supplying power to a load from a source of periodically pulsating potential, the combination comprising electric discharge valve means of the arc-like type interposed between said source and load, control means for rendering said valve means conductive at a preselected instant in each period of said source potential, means for initiating operation of said control means, and timing means for rendering said control means ineffective at substantially the end of the period only following the elapse of a preselected time after operation of said control means is initiated.

3. For use in supplying power to a load from a source of periodically pulsating potential, the combination comprising electric discharge valve means of the arc-like type interposed between said source and load, control means for rendering said valve means conductive at a preselected instant in each period of said source potential, an electric discharge device of the arc-like type operable to render said control means ineffective, a control circuit for said device, and means for impressing in said control circuit a potential the magnitude of which is varied in accordance with a certain quantity superimposed on a potential having a sharp, positive, magnitude peak at substantially the end of each period of said source, said device being rendered conductive when the resultant potential in said control circuit becomes more positive than a predetermined critical potential.

4. For use in supplying power to a load from a source of periodically pulsating potential, the combination comprising electric discharge valve means of the arc-like type interposed between said source and load, control means for rendering said valve means conductive at a preselected instant in each period of said source potential, means for initiating operation of said control means, an electric discharge device of the arc-like type operable to render said control means ineffective, a control circuit for said device, means operable upon initiation of operation of said control means for impressing in said control circuit a potential which gradually increases at a preselected rate in a positive direction, and means for also impressing in said control circuit a potential having a sharp, positive, magnitude peak at substantially the end of each period of said source potential, said device being rendered conductive when the resultant potential in said control circuit becomes more positive than a predetermined critical potential.

5. For use in supplying power to a load from a source of periodically pulsating potential, the combination comprising electric discharve valve means of the arc-like type interposed between said source and load, control means for rendering said valve means conductive at a preselected instant in each period of said source potential, means for initiating operation of said control means, an electric discharge device of the arc-like type operable to render said control means ineffective, a control circuit for said device, means for impressing in said control circuit a potential having a sharp, positive, magnitude peak substantially at the end of each period of said source potential, a capacitor in said control circuit, and means for charging said capacitor at a preselected rate in a positive direction from the time of initiation of the operation of said control means, said device being rendered conductive when the resultant potential in said control circuit becomes more positive than a predetermined critical potential.

6. For use in supplying power to a load from a source of alternating current potential, the combination comprising electric discharge valve means of the arc-like type interposed between said source and load, control means for rendering said valve means conductive at a preselected instant in each half period of said source potential, an electric discharge device of the arc-like type operable to render said control means ineffective, a control circuit for said device, means for impressing in said control circuit a first potential having the wave form of an inverted rectified alternating potential in phase with said source potential, and means for also impressing in said control circuit a second potential the magnitude of which varies in accordance with a certain quantity, said device being rendered conductive when the resultant potential in said control circuit becomes more positive than a predetermined critical magnitude.

7. For use in supplying power to a load from a source of alternating current potential the combination comprising electric discharge valve means of the arc-like type interposed between said source and load, control means for rendering said valve means conductive at a preselected instant in each half period of said source potential, an electric discharge device of the arc-like type operable to render said control means ineffective, a control circuit for said device, means for impressing in said control circuit a first potential having sharp, positive, magnitude peaks at regular intervals corresponding in phase position to the zero points on the wave of said source potential, means for impressing in said control circuit a second alternating potential displaced in phase relative to said source potential, the sum of said first and second potentials in said control circuit being less positive than a predetermined critical potential, and means for impressing in said control circuit a third potential which gradually increases in magnitude in a positive direction, said device being rendered conductive when the resultant potential in said control circuit is more positive than said critical potential.

8. For use in supplying power to a load from a source of alternating current potential, the combination comprising electric discharge valve means of the arc-like type interposed between said source and load, control means for rendering said valve means conductive at a preselected instant in each half period of said source potential, means for initiating operation of said control means, an electric discharge device of the arc-like type operable to render said control means ineffective, a control circuit for said device, means for impressing in said control circuit a first potential having sharp, positive, magnitude peaks at regular intervals corresponding in phase position to the zero points on the wave of said source potential, means for impressing in said control circuit a second alternating potential displaced in phase relative to said source potential, the sum of said first and second potentials in said control circuit being less positive than a predetermined critical potential, a capacitor in said control circuit, and means for charging said capacitor in a positive direction at a preselected rate from the time of initiation of operation of said control means, said device being rendered conductive when the resultant potential in said control circuit becomes more positive than said critical potential.

9. For use in supplying power to a load from a source of alternating current potential, the combination comprising electric discharge valve means of the arc-like type interposed between said source and load, control means for rendering said valve means conductive at a preselected instant in each half period of said source potential, an electric discharge device of the arc-like type operable to render said control means ineffective, a control circuit for said device, means for impressing in said control circuit a first potential having the wave form of an inverted rectified alternating potential in phase with said source potential, means for impressing in said control circuit a second alternating potential displaced in phase relative to said source potential, the sum of said first and second potentials being always less positive than a predetermined critical potential, and means for also impressing in said control circuit a third potential the magnitude of which varies in accordance with a certain quantity, said device being rendered conductive when the resultant potential in said control circuit becomes more positive than a predetermined critical potential.

10. For use in supplying power to a load from a source of alternating current potential, the combination comprising electric discharge valve means of the arc-like type interposed between said source and load, control means for rendering said valve means conductive at a preselected instant in each half period of said source potential, an electric discharge device of the arc-like type operable to render said control means ineffective, a control circuit for said device, means for impressing in said control circuit a first potential having the wave form of an inverted rectified alternating potential in phase with said source potential, means for impressing in said control circuit a second alternating potential displaced in phase relative to said source potential including means for adjusting the phase of said second potential at will so that it leads or lags said source potential as desired, the sum of said first and second potentials being always below a predetermined critical potential, and means for also impressing in said control circuit a third potential the magnitude of which varies in accordance with a certain quantity, said device being rendered conductive when the resultant potential in said control circuit becomes more positive than a predetermined critical potential.

11. In combination, an electric discharge valve of the arc-like type having a plurality of principal electrodes, means for impressing a potential across said principal electrodes, a control circuit for said valve, means for impressing in said control circuit a first potential having sharp magnitude peaks at regular intervals, means for impressing in said control circuit a second alternating potential so related in phase and frequency to said first potential that said peaks occur at other than the zero points on the wave of said second potential, the sum of said first and second potentials always being less positive than a predetermined critical potential and means for impressing in said control circuit a third potential which gradually increases in magnitude in a positive direction at a preselected rate, said valve being rendered conductive when the resultant potential in said control circuit becomes more positive than said critical potential.

12. In combination, an electric discharge valve of the arc-like type having a plurality of principal electrodes means for impressing a potential across said principal electrodes, a control circuit for said valve, means for impressing in said control circuit a first, alternating potential, means for impressing in said control circuit a second potential having the wave form of an inverted rectified alternating potential displaced in phase relative to said first potential, the sum of said first and second potentials always being less positive than a predetermined critical magnitude, and means for impressing in said control circuit a third potential which gradually increases in magnitude in a positive direction, said valve being rendered conductive when the resultant potential in said control circuit becomes more positive than said critical potential.

CLYDE E. SMITH.